United States Patent [19]

Jordan

[11] Patent Number: 5,894,511
[45] Date of Patent: Apr. 13, 1999

[54] VALIDATION QUERY BASED ON A SUPERVISORY SIGNAL

[75] Inventor: David Jordan, Alexandria, Va.

[73] Assignee: MCI Worldcom, Inc., Ga.

[21] Appl. No.: 08/671,184

[22] Filed: Jun. 27, 1996

[51] Int. Cl.[6] ............................................. H04M 15/00
[52] U.S. Cl. .......................... 379/114; 379/121; 379/144; 379/154
[58] Field of Search ........................... 379/111, 112, 379/114, 115, 117, 118, 120, 121, 130, 134, 138, 144, 154, 201, 207, 91.01, 91.02

[56] References Cited

U.S. PATENT DOCUMENTS

| | | | |
|---|---|---|---|
| 4,797,910 | 1/1989 | Daudelin | 379/67 |
| 5,003,584 | 3/1991 | Benyacar et al. | 379/119 |
| 5,043,983 | 8/1991 | Dorst et al. | 379/96 |
| 5,185,781 | 2/1993 | Dowden et al. | 379/67 |
| 5,187,740 | 2/1993 | Swaim et al. | 379/209 |
| 5,210,789 | 5/1993 | Jeffus et al. | 379/127 |
| 5,223,699 | 6/1993 | Flynn et al. | 379/144 |
| 5,287,403 | 2/1994 | Atkins et al. | 379/144 |
| 5,319,701 | 6/1994 | Hird et al. | 379/132 |
| 5,414,754 | 5/1995 | Pugh et al. | 379/67 |
| 5,463,677 | 10/1995 | Bash et al. | 379/144 |
| 5,483,581 | 1/1996 | Hird et al. | 379/144 |
| 5,627,887 | 5/1997 | Freedman | 379/142 |
| 5,655,013 | 8/1997 | Gainsboro | 379/188 |

*Primary Examiner*—Paul Loomis
*Assistant Examiner*—Binh K. Tieu

[57] ABSTRACT

A telephone system and method is provided for delaying authorization validation queries until a dialed phone is answered. This way, authorization validation queries are avoided in cases where a requested phone line is busy or not answered. In a collect call scheme the system may even delay queries until a party agrees to accept the collect call billing charges. This way, query charges are avoided not only for busy signals and no-answers, but also in the event that the requested party declines to accept the charges. Because authorization validation queries typically take less than one half of a second, parties are not significantly affected by the delay.

36 Claims, 13 Drawing Sheets

DELAYED L.I.D.B. ALTERNATIVE BILLING SCHEME

TYPICAL ALTERNATIVE BILLING SCHEME PHONE SYSTEM

TYPICAL ALTERNATIVE BILLING SCHEME PHONE SYSTEM
EMPLOYING AN AUTOMATED OPERATOR SYSTEM

TYPICAL ALTERNATIVE BILLING SCHEME PHONE SYSTEM

B.N.S. FEED-BACK OPTION

LIDB FEED-BACK OPTION

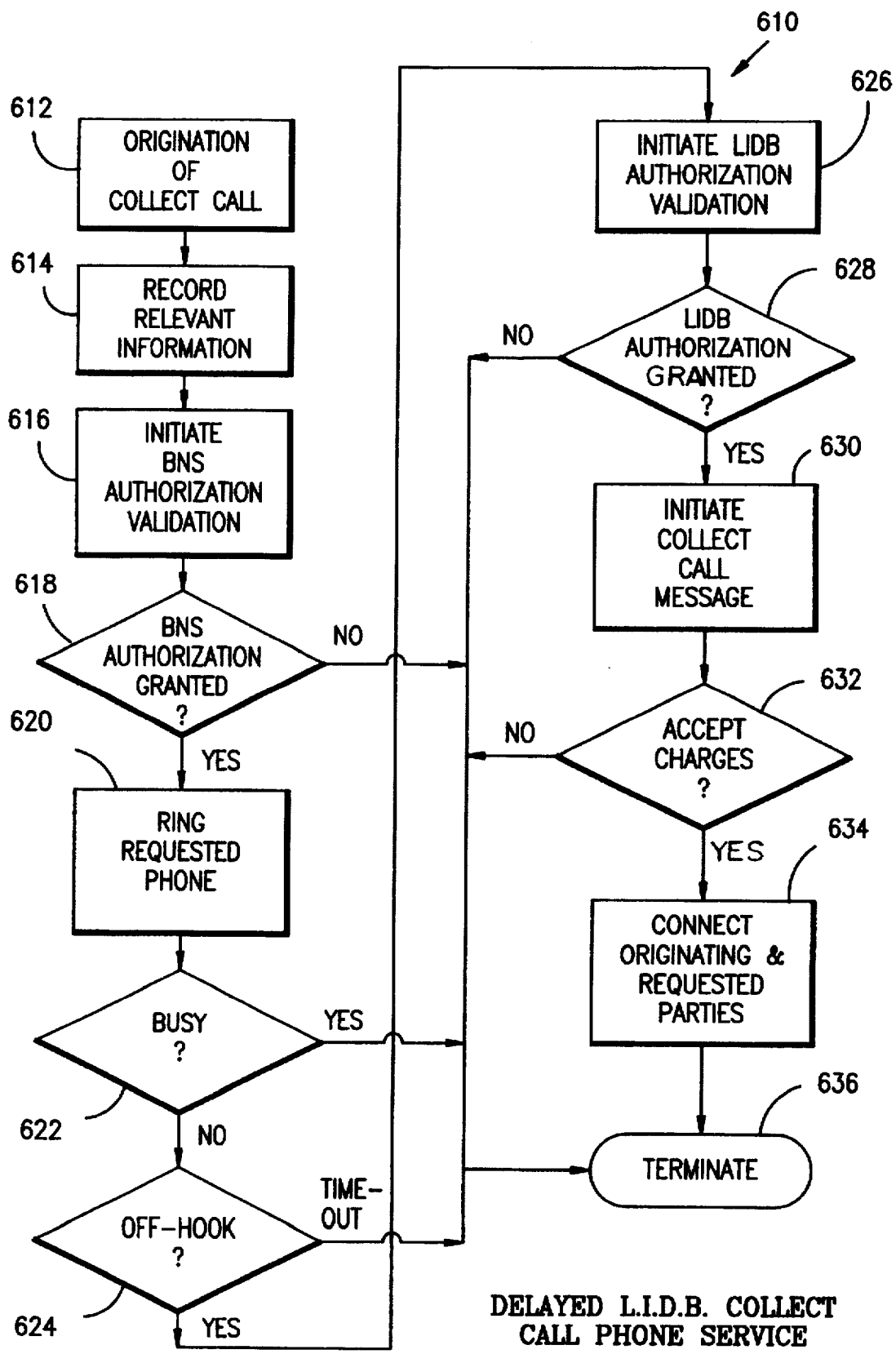

B.N.S. FEED-BACK OPTION

LIDB FEED-BACK OPTION

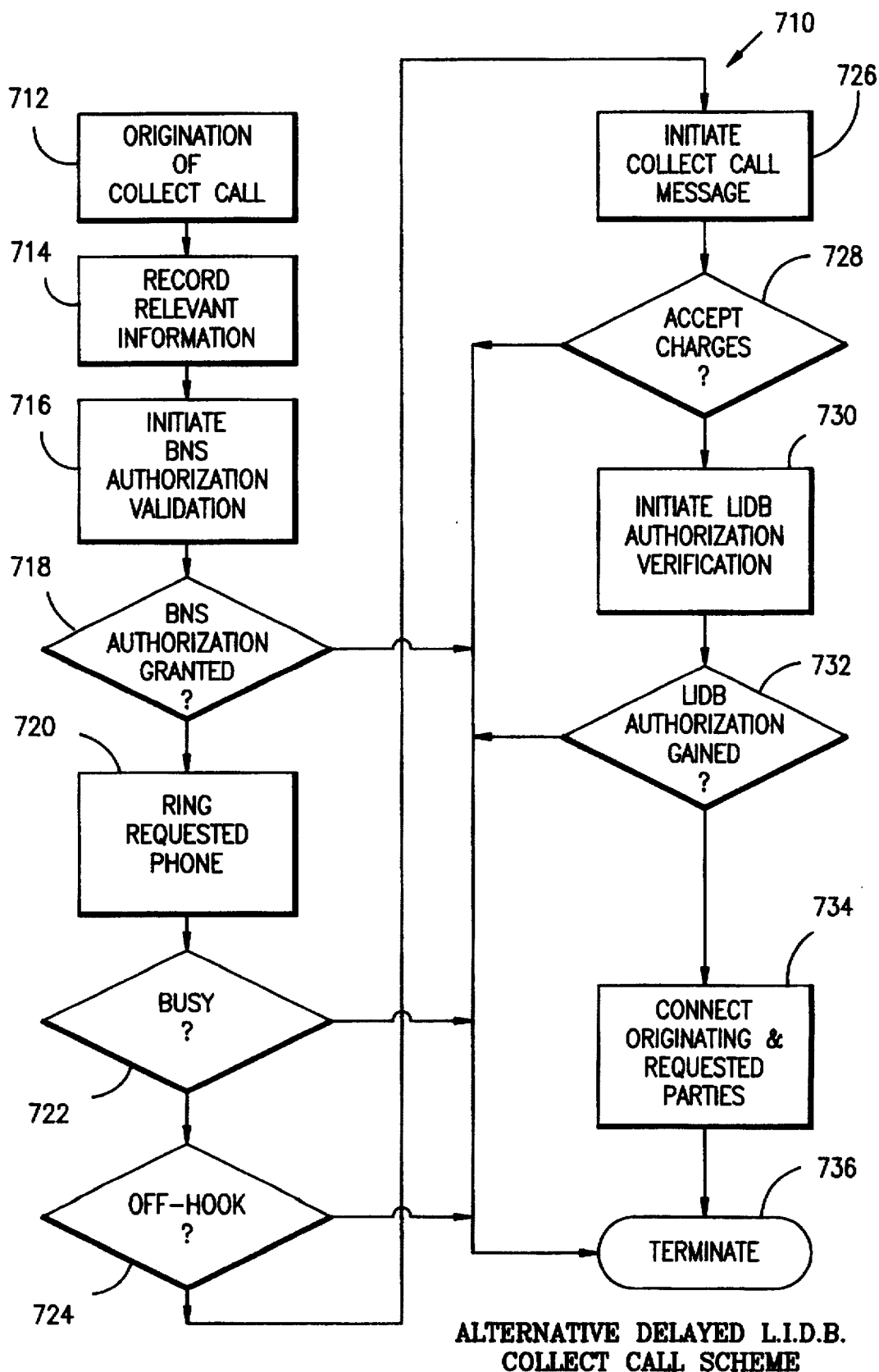
FIG. 7A — ALTERNATIVE DELAYED L.I.D.B. COLLECT CALL SCHEME

B.N.S. FEED-BACK OPTION

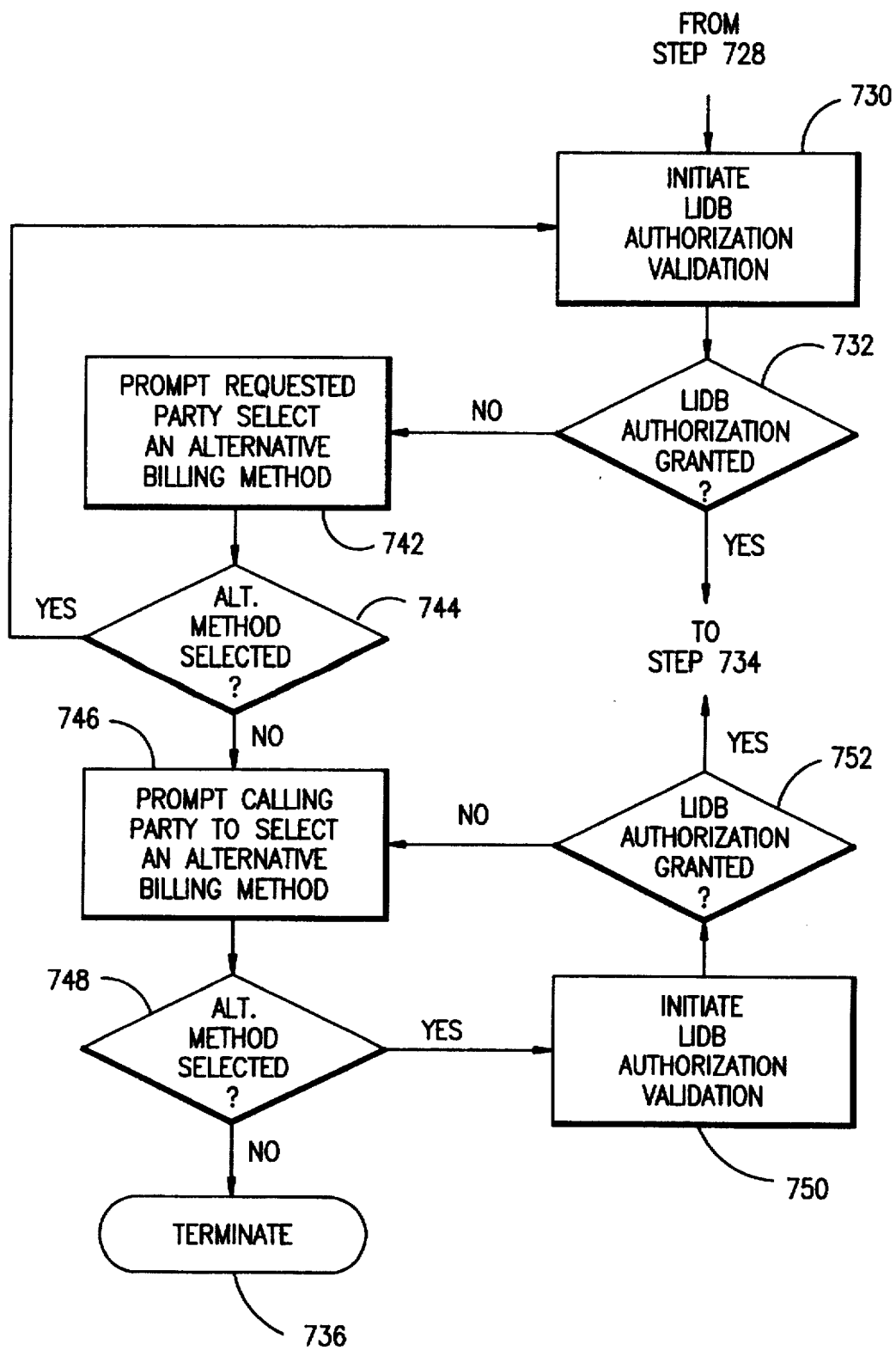
FIG. 7C — LIDB FEED-BACK OPTION FOR ALT. DELAYED LIDB COLLECT CALL SHEME 5,894,511

1

VALIDATION QUERY BASED ON A SUPERVISORY SIGNAL

BACKGROUND OF THE INVENTION

1. Field of the Invention

The present invention relates generally to telephone systems and, more particularly, to telephone authorization validation systems.

2. Related Art

In telephone communication systems, telephone calls are generally charged to the account of the originating telephone. In many situations, however, other billing methods are desired. For instance, a call originator may wish to place a collect call, where the receiving party, rather than the call originator, is billed for the call. A collect call may be desired where the call is for the primary benefit of the receiver or where the account associated with the receiving phone belongs to the originating caller himself Alternatively, an originating caller may wish to have a call charged to a third party telephone account or to a credit card account, such as a Local Exchange Card (LEC) offered by a local telephone company. Alternative billing schemes benefit users by providing more convenient methods of billing and benefit phone companies by increasing the number of revenue sources.

Because it is difficult to verify the identity of a user and because an account, although previously valid, may no longer be valid, there is a serious potential for abuse of alternative billing schemes. Because such fraudulent use of phone services results in lost revenue for phone companies, fraud is compensated for with higher rates to paying customers. Et is important, therefore, to phone companies and paying customers, to insure against fraudulent use of alternative billing schemes.

In order to reduce fraudulent use of alternative billing schemes, some method must exist for validating the authority of a user to employ one of these alternative billing schemes. In a collect call situation, for instance, a method must exist for verifying whether the receiving party or the account associated with the receiving telephone is properly authorized to accept a collect call. Such a verification might include insuring that the account associated with the receiving phone is current, that its bill paying history is adequate and that the account holder has not previously declared that collect calls will not be accepted. In the case of third party billing or credit card billing, a method must exist for verifying the existence of the credit account or of the third party to be billed and, possibly, for requesting authorization from the credit card company or the third party.

Currently, many phone companies employ Line Information Data Bases or LIDBs for validating authorizations. LIDBs are private data bases providing such services as Originating Line Number Screening, Calling Card Validation, Billing Number Screening, Calling Card Fraud and Public Telephone Checks. LIDBs typically contain all of the valid telephone and card numbers in their regions and the necessary information to perform billing validation. Upon receipt of authorization from a LIDB, the telephone company will place the call to the receiving party. Note that if the call is a collect call, the telephone company will have to receive authorization from the receiving party, in addition to the LIDB authorization. LIDBs are typically organized regionally as stand-alone systems. Efforts are under way, however, to integrate regional LIDBs into a larger entity.

In addition to LIDBs, Bad Number System (BNS) data bases are also employed for authorization validation.

2

Essentially, a BNS is a telephone company internal data base for maintaining histories of user names, credit card numbers and phone numbers, especially those which have a history of failure to pay or a history of failure to receive LIDB approval. A BNS may also contain cross references between receivers who routinely decline to accept charges from particular originators. A BNS is typically employed as a pre-screen or filter which serves to terminate a requested call, based on bad prior history, prior to initiating a LIDB query.

In operation, upon receiving a request for an alternative billing scheme, a telephone company will attempt to validate authorization. The authorization process will usually begin with a local or internal BNS query. If BNS authorization is granted, the telephone system queries an external LIDB. If the LIDB grants authorization to make the requested alternative billing call, the phone system dials the requested number and waits for a response. If the response is a busy tone, the call is terminated. If the line is not busy but, after some predetermined number of rings, there is no answer, the phone system declares a time-out and terminates the call. If, however, an off-hook condition is detected, that is, if someone picks up the dialed telephone, then the call originator and the requested party are connected. In a collect call situation, of course, the parties are not connected until the requested party accepts the charges.

While LIDBs reduce losses associated with alternative billing schemes, they come with a heavy price. For every validation query, regardless of whether authorization is granted, the phone company is charged a query fee. For some telephone companies these query fees can run into the tens of millions of dollars per month. These costs are generally passed on to consumers in the form of higher rates for service.

One area of particular concern to telephone companies, with respect to LIDB costs, is collect-call only telephones. Collect-call-only telephones are telephones which are designed to make collect calls and no others. These phones are employed in order to avoid damage from any attempted theft of coins. These phones are most often employed in correctional facilities and high crime areas.

Briefly, collect call-only telephones include a keypad and a telephone handset but no coin-receiving slots. These telephones are typically coupled to the phone network through an automated operator system which is designed to preclude direct voice contact between call originators and phone company employees. This is, in part, to avoid harassing comments and threats to live operators.

In operation, when an off-hook condition is detected on a collect-call-only telephone, the automated operator generates a message to the effect of, "please enter the requested number." After dialing the desired number, the automated operator prompts the originator to "please state your name." After providing name and requested telephone number, the originator waits while the automated operator seeks authorization to place the call. Again, authorization typically includes a local BNS data base search followed by a LIDB search. Upon receiving authorization, the automated operator dials the requested party. If the automated operator detects a busy signal the call is terminated. If the requested phone rings a predetermined number of times without answering, the automated operator declares a time-out and, again, the call is terminated. If, however, the automated operator detects an off-hook condition, it assumes that an individual has answered the phone and initiates a collect call message. The collect call message informs the receiver that a collect call has been requested and provides the name of the originator which was recorded at the initiation of the call. If the requested party indicates a willingness to accept the charges for the call, the originator and the requested party are connected for conversation.

The reason that phone companies are particularly concerned with correctional facility collect-call-only telephones is the high rate of prematurely terminated calls. Recall that, after LIDB validation authorization, there are still three cases in which a collect call may be prematurely terminated. These three conditions are a busy tone, a no answer time-out and a refusal to accept charges. Only if all of these hurdles are passed can a collect call be completed.

It is estimated that nearly sixty percent of all correctional facility collect calls are prematurely terminated after receiving LIDB authorization validation. Because each LIDB query is billable to the requesting phone company, and because a large number of collect calls from correctional facilities are prematurely terminated, a large number of LIDB charges are incurred without a subsequent billable event, i.e., completed telephone call. As a result, while telephone companies in general are subjected to substantial LIDB inquiry charges per billable even or completed call, telephone companies which serve correctional facilities are subjected to even greater LIDB charges per billable event. Although collect calls from correctional facilities are often subject to an initial fee of between two and three dollars at the outset of a call, these fees are generally destined for the correctional facility itself as a type of user-fee. These fees do not, therefore, offset the costs of unnecessary LIDB queries. As a result, charges for unnecessary LIDB queries are generally be passed on to the paying customers of the telephone companies in the form of higher rates.

A method and system is desired, therefore, which will substantially reduce or eliminate unnecessary LIDB queries related to alternative billing schemes and collect call schemes in particular.

SUMMARY OF THE INVENTION

The present invention is directed toward a system and method for reducing the number of authorization validations in a phone system.

One advantage of the present invention is that it reduces the number of authorization validation queries necessary in alternative billing schemes.

Another advantage of the present invention is that it may be employed in collect call systems, credit card calling systems and third party billing systems.

Another advantage of the present invention is that it can be employed with collect call-only telephones.

Yet another advantage of the present invention is that it may be employed in existing telephone systems without any additional hardware.

In a preferred embodiment, when a call originator requests an alternative form of billing for a telephone call, an authorization validation is postponed until an off-hook condition is detected on the requested phone fine. In this way, if a call is prematurely terminated due to a busy signal or no-answer time-out, no authorization validation charges are incurred.

Delaying an authorization validation until an off-hook condition is detected is possible because, while an authorization validation typically takes less than one-half of a second, a call receiver typically takes more than one-half a second to place the handset to the his or her ear. As a result, the phone connection will be complete by the time the receiving party places the phone to their ear. A typical receiving party, therefore, will not notice any significant time delay between the time of pick-up and the time of connection.

In a collect calling environment, the present invention provides two possible scenarios or embodiments for reducing authorization validation queries. In the first, authorization validations are postponed, as above, until an off-hook condition is detected, immediately after which an authorization validation query is initiated. Upon receipt of authorization, the requested party is then prompted to accept or decline the charges. By not performing authorization validations on busy or non-answered calls, authorization validations charges are substantially reduced.

In the second collect calling scenario or embodiment, authorization validations are delayed even further, until after the requested party indicates a willingness to accept charges. In this way, authorization validations charges are avoided, not only for busy signals and time-outs, but also in cases where the requested party declines to accept the calling charges. Authorization validations, thus, are initiated only when absolutely necessary. That is, validations occur only where a requested party has not only answered a phone but has indicated a willingness to accept the charges for the call.

Although the requested party will be waiting on-hold during the authorization validation, because authorization validations take less than ½ a second, the delay will be practically transparent to the receiver. In the event that authorization validation is denied, the call is terminated. Where permitted, phone companies may choose to record the authorization validation denial, and the reasons therefore, in an internal data base for future reference.

Further features and advantages of the present invention, as well as the structure and operation of various embodiments of the present invention, are described in detail below with reference to the accompanying drawings.

BRIEF DESCRIPTION OF THE FIGURES

The present invention is described with reference to the accompanying drawings. In the drawings, like reference numbers indicate identical or functionally similar elements. Additionally, the left-most digit of a reference number identifies the drawing in which the reference number first appears.

FIG. 6A is a sequence-of-events flow diagram a first embodiment of a delayed authorization validation collect call phone system, in accordance with the present invention.

FIG. 7A is a sequence-of-events flow diagram for a second embodiment of a delayed authorization validation collect call phone system, in accordance with the present invention.

FIG. 7C is a sequence-of-events flow diagram for a LIDB feedback option for the delayed authorization validation collect call phone system of FIG. 7A.

DETAILED DESCRIPTION OF THE PREFERRED EMBODIMENTS

Existing alternative billing scheme telephone systems attempt to validate authorization as soon as an alternative billing request is received. For instance, when a caller requests that a call be charged to a third party, a local BNS data base query is executed, followed by a query to an external LIDB. These queries will seek to determine whether the third party exists, whether that third party's credit history is sufficient and, possibly, whether that third party is willing to accept such charges. For each LIDB query, the phone company is charged a fee. Only after receiving authorization validation does the system attempt to place the call. If the line of the receiving party is busy or if the receiving party fails to answer, then the LIDB query is wasted in the sense that no billable service is provided by the phone company to a paying customer.

Similarly, upon receipt of a request to place a collect call, a BNS query is executed followed by a LIDB query. Thereafter, the call is placed to the requested party. If the requested line is busy or there is no answer or even if the called party answers but reuses to accept the charges, the LIDB query is again wasted.

The present invention eliminates most, if not all of the above-described unnecessary LIDB queries. It does so by delaying such queries at least until an off-hook condition is detected.

Figure 1:
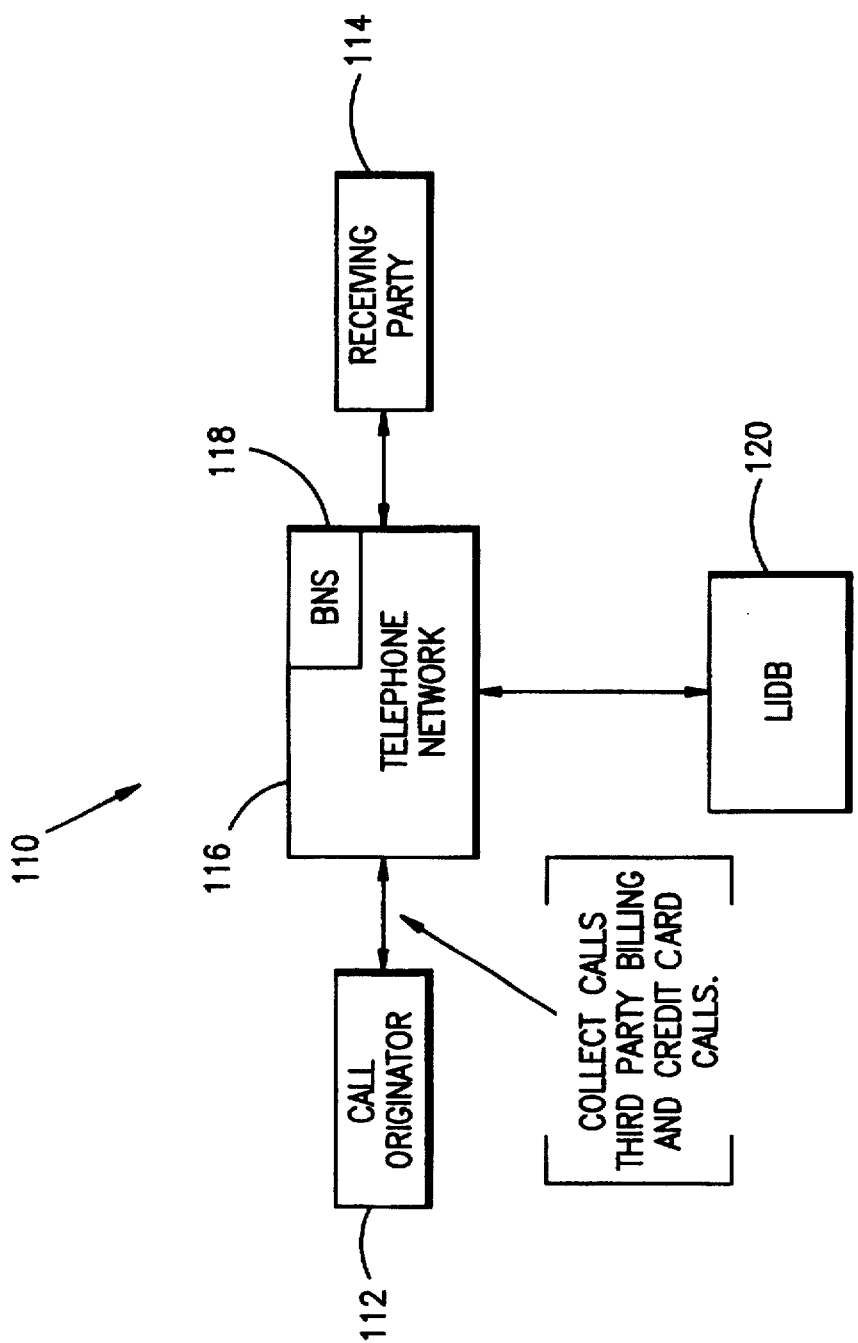
FIG. 1 is a high-level block diagram of a typical alternative billing scheme phone system.

Referring to FIG. 1, a high level block diagram of a typical alternative billing scheme telephone system is shown. A call originator 112 is connected to a receiving party 114 through a telephone network 116. Originator 112 may place any of a number of alternative billing telephone calls, including collect calls, third party billing calls and credit calls. Credit cards may be of any type, including Local Exchange Cards (LEC), issued by local carriers.

Upon receipt of a request for an alternative billing phone connection, telephone network 116 initiates a query to a local Bad Number Screening (BNS) database. A BNS database may store any of a variety of data for assisting the phone company in determining whether to continue with a particular request. A BNS database is typically owned, operated and maintained by the telephone company. Generally, there are no charges associated with a BNS search. In the event that the BNS finds a bad credit history associated with the caller (or with the receiver in the case of a collect call), the call may be terminated. If the BNS database authorizes validation, telephone network 116 then issues a query to a Line Information Data Base 120 or LIDB.

Recall that LIDBs such as LIDB 120 are private data bases providing such services as Originating Line Number Screening, Calling Card Validation, Billing Number Screening, Calling Card Fraud and Public Telephone Checks. LIDBs typically contain all of the valid telephone and card numbers in their regions and the necessary information to perform billing validation. If, after querying BNS 118 and LIDB 120, the call is authorized, telephone network 116 connects call originator 112 to receiving party 114. In the event that the requested alternative billing call is a collect call, receiving party 114 will, of course, be permitted an opportunity to accept or decline the charges.

Figure 2:
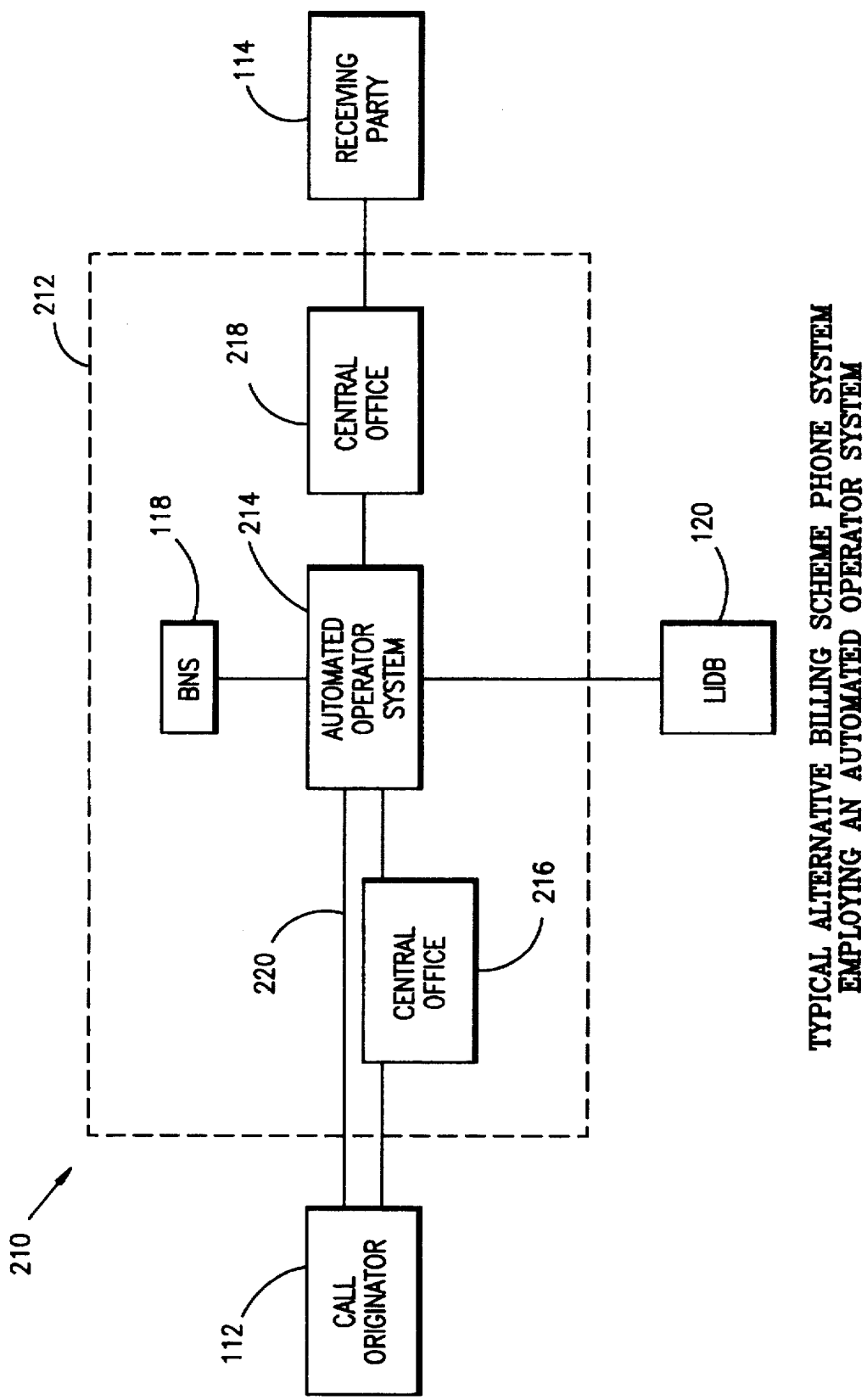
FIG. 2 is high-level block diagram of a typical alternative billing scheme phone system employing an automated operator system.

Referring to FIG. 2, an alternative billing scheme phone system 210 is shown employing a telephone network 212, analogous to network 116 in FIG. 1. Here, network 212 includes an automated operator system 214 interconnecting first and second central offices 216 and 218, respectively. System 210 also includes BNS data base 118 and LIDB 120.

Typically, originator 112, requests an alternative billing method from a central office 216. Originator 112 may speak with a live operator associated with central office 216 or may be guided through a series of questions which will seek to determine the type of alternative billing scheme desired by originator 112. In either event, after central office 216 determines the desired alternative billing scheme, control of that request is handed over to automated operator system 214. Automated operator 214 executes authorization validation queries on BNS 118 and LIDB 120. Upon receipt of authorization, automated operator 214 directs the call to receiver 114 through central office 218. In the event that originator 112 requests a collect call, automated operator system 214 will request, through central office 218, that receiver 114 either accept or decline charges.

In a case where originator 112 is calling from a collect call-only telephone, a direct connection line 220 may exist between originator 112 and automated operator 214. Direct connection line 220 is possible where automated operator 214 is configured to treat all of-hook conditions on line 220 as requests for collect calls. In this way, central office 216 facilities are bypassed, permitting those facilities to service the needs of other callers. In the event that such a collect call-only telephone is installed in a correctional facility, direct line 220 also insures that there is no direct contact between inmates and live operators at central office 216.

In operation, when a collect call-only telephone is used, originator 112 need only lift the handset from the phone hook in order to initiate a collect call. When the automated operator system detects an off-hook condition, it prompts originator 112 to state his or her name. When originator 112 states his or her name, it is recorded by automated operator 214. Originator 112 is then prompted to enter the desired telephone number through a touch-panel key-pad associated with the telephone. Upon receipt of the name of originator 112 and the desired phone number, automated operator system 214 queries BNS database 118. Upon authorization from BNS 118, automated operator system 214 queries LIDB 120 for authorization. Only after LIDB 120 validates the authorization for a collect call, will automated operator system 214 forward the call to receiver 114 through central office 218. Again, receiver 114 will be provided an opportunity to accept or decline the call prior to connection.

Figure 3:
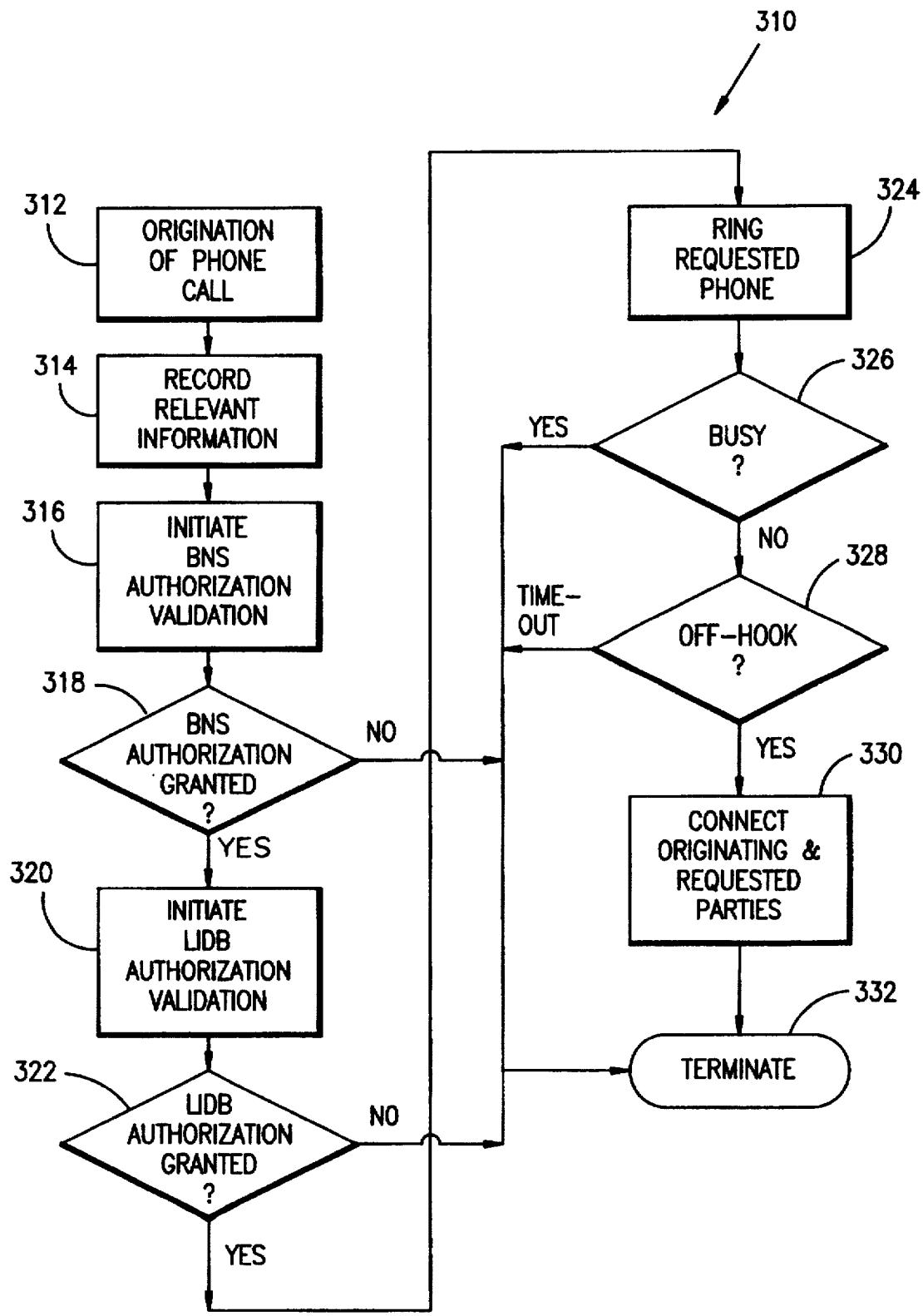
FIG. 3 is a sequence-of-events flow diagram for a typical alternative billing scheme phone system.

Referring to FIG. 3, a sequence of events is depicted in flow-chart format, for a typical alternative billing scheme 310. Although most alternative big schemes operate substantially in accordance with this scheme, at least one billing scheme, namely collect calls, does not. This is because collect calls typically require at least one additional step which provides the intended receiver with an opportunity to accept or decline charges. Because of the difference between collect calls and other types of alternative billing call, collect calls are discussed separately in relation to FIG. 4.

Regarding typical alternative billing scheme 310, in step 312, an originator requests an alternative billing phone call. In step 314, necessary information is collected from the call originator. The type of information necessary depends upon the billing method requested. If the request is for a credit card charge, the necessary formation includes credit card number and expiration date. If the request is for third party billing, the necessary information includes the third party phone number. Recall that collect calls are dealt with separately.

In step 316, the first part of a two step authorization validation procedure, namely Bad Number Screening or BNS authorization, is initiated. As previously stated, a BNS data base is a local, telephone company maintained data base which typically stores data related to individuals and telephone numbers based on prior experiences with those individuals and telephone number accounts. There are generally no fee charges associated with a BNS search.

In step 318, a determination is made regarding BNS authorization. If a search of the BNS data base determines that the account to be charged has a bad credit history, the call may be terminated. If BNS authorization is granted, a second validation is performed.

In step 320, the second validation consists of a query to an external LIDB. The LIDB will determine whether the account to be billed is current and in good standing.

In step 322, a decision is made regarding LIDB authorization. If LIDB authorization is denied, the call is terminated. If LIDB authorization is granted, the telephone system attempts to call the requested party. In either event, regardless of whether LIDB authorization is granted, the LIDB provider will bill the telephone company for the query service. As a result, even if a call is subsequently terminated because of a busy signal or a failure to answer, the phone company is still subjected to a charge for the LIDB query.

In step 324, after LIDB authorization, the telephone system rings the requested phone. In step 326, if a busy signal is detected, the call is terminated. If no busy signal is detected, the telephone system will ring the requested phone up to a predetermined number of rings. In step 328, if the number of rings reaches a predetermined number of rings, the telephone system declares a time-out and terminates the requested call.

If, in step 328, an off-hook condition is detected, i.e., someone picks the phone hand-set off of the hook, the telephone system presumes that a person on the receiving end is listening and connects the parties in step 330. At this point a billable event exists.

As can be seen, there are a number of scenarios whereby, after incurring LIDB query charges, a call is still prematurely terminated. These scenarios include busy signals and no answers. When this occurs, the phone company is charged for the LIDB query without completing a billable event, or telephone call. These LIDB queries are, therefore, essentially wasted.

Figure 4:
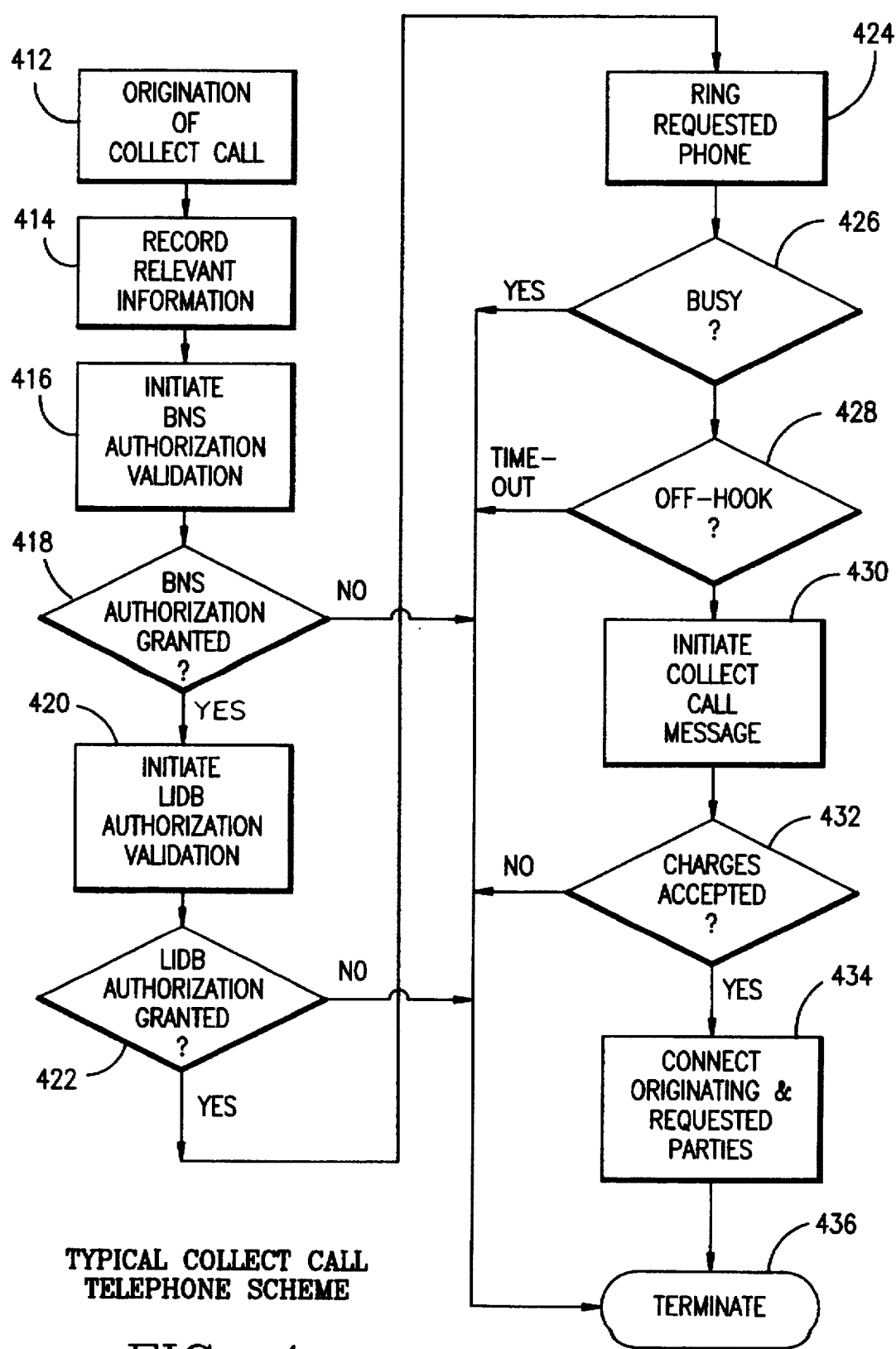
FIG. 4 is a sequence-of-events flow diagram for a typical collect call billing scheme phone system.

In FIG. 4, a typical sequence of events is depicted, in flow-chart format, for a collect call billing scheme 410. Steps 412 through 428 are substantially identical to steps 312 through 328 of scheme 310. There are, however, several minor differences. In step 414, for instance, the information required from the collect call originator includes the name of the originator which is completely unnecessary in step 314. Likewise, there is no need in step 418 for credit account numbers or a third party billing phone numbers as in step 414. And in steps 418 and 420, the BNS and LIDB queries seek to determine whether the requested party is likely to pay whereas in steps 318 and 320 the inquiry is focused on the originator or third party's ability to pay.

The big difference between schemes 310 and 410, is the sequence of events which occur after an off-hook condition is detected. Essentially, because a collect call requires permission from the requested party to accept the charges, the steps following an of-hook condition in collect calling scheme 410 provide for requesting and receiving such permission from the requested party.

Specifically, in step 430, after an off-hook condition is detected in step 428, a collect call message is relayed to the requested party. This message may be prerecorded or may come from a live operator. Where an automated operator system is employed in the telephone network, the automated operator initiates the collect call message, informing the receiver of the name of the calling party which was recorded in step 414 and requesting the receiver to indicate whether charges will be accepted. The automated phone answering system may permit the receiver to respond with a "yes" or a "no" voice response or it may request the receiver to indicate acceptance or refusal with specific touches on a keypad.

In step 432, a determination is made as to whether the requested party is willing to accept the charges. If the charges are declined, the call is terminated in step 436. If the charges are accepted, they are connected in step 434 and the receiving party is billed for the charges. At the end of the call, when either the originator or receiver hangs up their respective telephone, and on-hook condition is detected by the system and the call is terminated at step 436.

Because LIDB queries are billable events, it is important to make no more LIDB queries than necessary. Any time a call is prematurely terminated after an LIDB has validated authorization, whether terminated because of a busy signal or because of a time-out, the LIDB query is wasted because the telephone company never has an opportunity to perform a billable service. Thus, in the event of premature termination in steps 326, 328, 426 or 428, LIDB charges are wasted and must be absorbed by the phone company. These charges will likely be passed on to other paying customers through higher rates.

It is estimated that, in the general public, up to 20% of all alternative billing scheme calls are prematurely terminated before the parties are connected. These premature terminations are generally due to busy signals or time-out attempts. Regardless of the reasons, the fact is that roughly 20% of alternative billing scheme calls incur LIDB charges without leading to a billable phone call.

More alarming is that, within incarceration facilities, where typically 100% of the phone calls are collect calls, it is estimated that as many as 60% of the calls are prematurely terminated. While the reasons for this are not entirely clear, the result is that collect-call-only telephones located within incarceration facilities cause telephone companies to incur unusually high LIDB costs per completed billable telephone call. Because LIDB fees may run into the millions of dollars per month, these fees, particularly, within incarceration facilities, have become of great concern to phone companies.

The present invention significantly reduces LIDB fees by delaying LIDB inquiries at least until an off-hook condition is detected. This way, LIDB charges for busy fines and non-answered calls are avoided. As in schemes 310 and 410, because collect call schemes require agreement from the requested party to accept charges, collect call embodiments of the present invention will be described separately in relation to FIGS. 6 and 7.

Figure 5A:
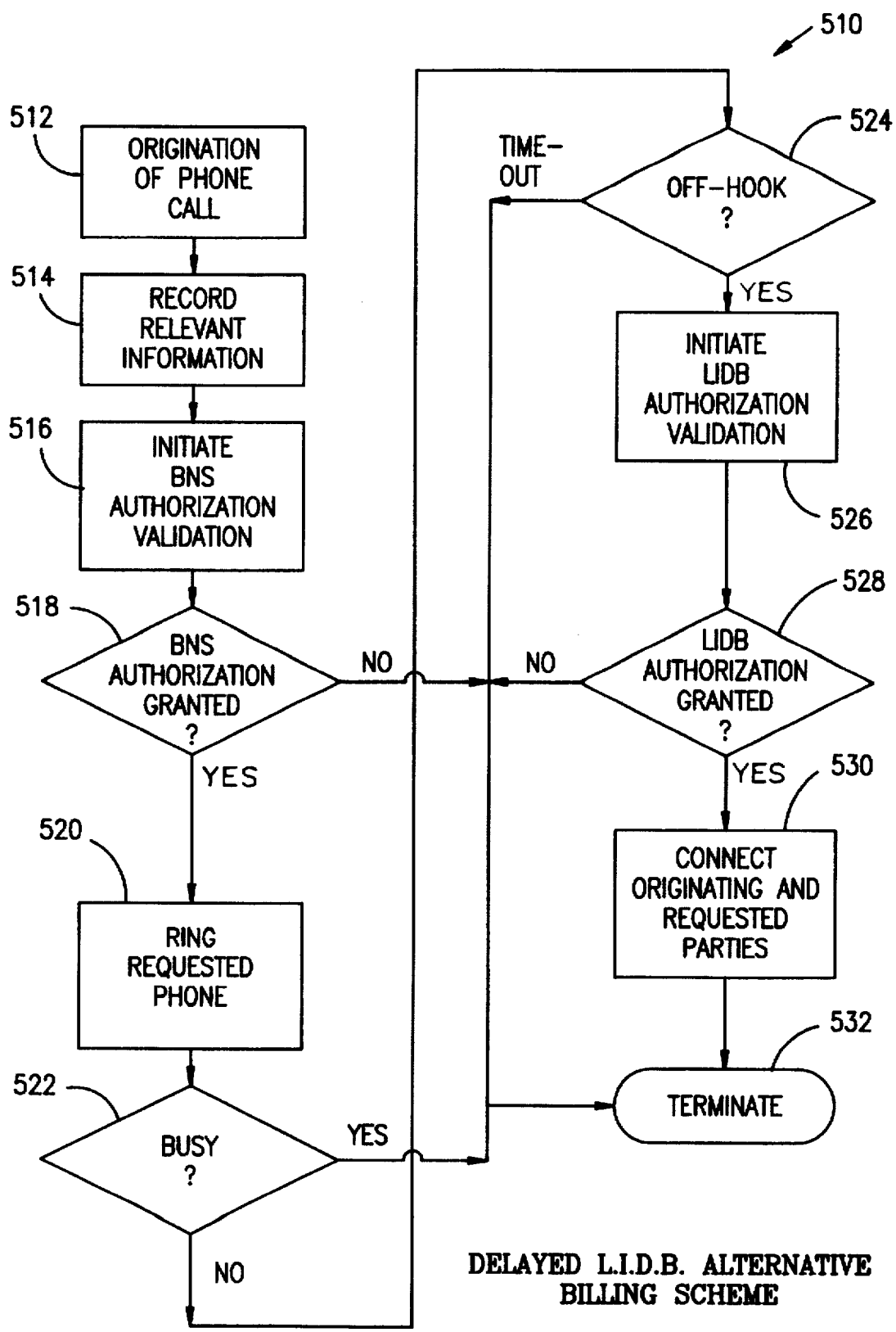
FIG. 5A is a sequence-of-events flow diagram for a delayed authorization validation phone system in accordance with the present invention.

Referring to FIG. 5A, an improved general alternative billing scheme 510 is provided. Although scheme 510 begins in much the same fashion as scheme 310, LIDB inquires occur in scheme 510, if at all, only after an off-hook condition is detected.

In step 512, a request for an alternative billing telephone call originates in essentially the same manner as in step 312 of scheme 310. In step 514, necessary billing information is obtained from the originator.

In step 516, an authorization validation request is initiated at a local BNS. As previously described, this is a query to a local data base which contains information obtained through prior history transactions with the calling and receiving parties and their associated accounts. In step 518, if BNS authorization is denied, the call is terminated before any LIDB costs are incurred by the phone company. If BNS authorization is granted in step 518, the requested phone is dialed in step 520.

In step 522, if the requested phone line is busy, the call is terminated. If not, then, in step 524, the system continues to ring. If, in step 524, the phone rings a predetermined number of times without answer, the system declares a time-out and the call is terminated. If, instead, an off-hook condition is detected in step 524, then, and only then, is an LIDB query initiated in step 526.

In this way, LIDB authorization query is delayed until it is determined that someone is available at the requested number. This is a significant departure from scheme 310 since, in scheme 310, LIDB validation is performed before the requested phone is ever dialed. By delaying LIDB queries until an off-hook condition is detected, the present invention avoids LIDB queries for those calls which will prematurely terminate anyway due to busy signals or non-answers. The present invention, thus, greatly reduces the number of unnecessary LIDB queries and, consequently, unnecessary LIDB charges.

In step 528, a determination is made regarding LIDB authorization. If LIDB authorization is denied, the call is terminated. If LIDB authorization is granted, then, in step 530, the parties are connected for conversation. At the conclusion of the call the originating or requested party hangs up their respective phone. Upon detection of an on-hook condition in step 532, the phone system terminates the call.

Although delaying the LIDB query until the receiving party has already taken the phone off the hook may appear to inconvenience that party, it has been determined that, because LIDB queries take, at most, up to about 0.5 seconds, the LIDB query will usually conclude before the receiving party actually places the handset against his or her ear. In addition, the requested party may be informed, by a live operator or a pre-recorded message, than an internal procedure in being performed an that, upon its completion, the parties will be connected. Alternatively, pre-recorded music may be played over the phone until the LIDB query is complete. Thus, the number of LIDB queries is substantially reduced without inconveniencing any of the parties involved.

Note that in step 518, in the event that BNS authorization is denied because of a bad account provided by the caller, the call is terminated. A phone company may, however, wish to provide the caller with an opportunity to select another alternative method of billing the requested call. This is analogous to a situation where a consumer of ordinary goods is provided an opportunity to produce an alternative form of payment in the event that a tendered credit card is declined by a credit check.

Figure 5B:
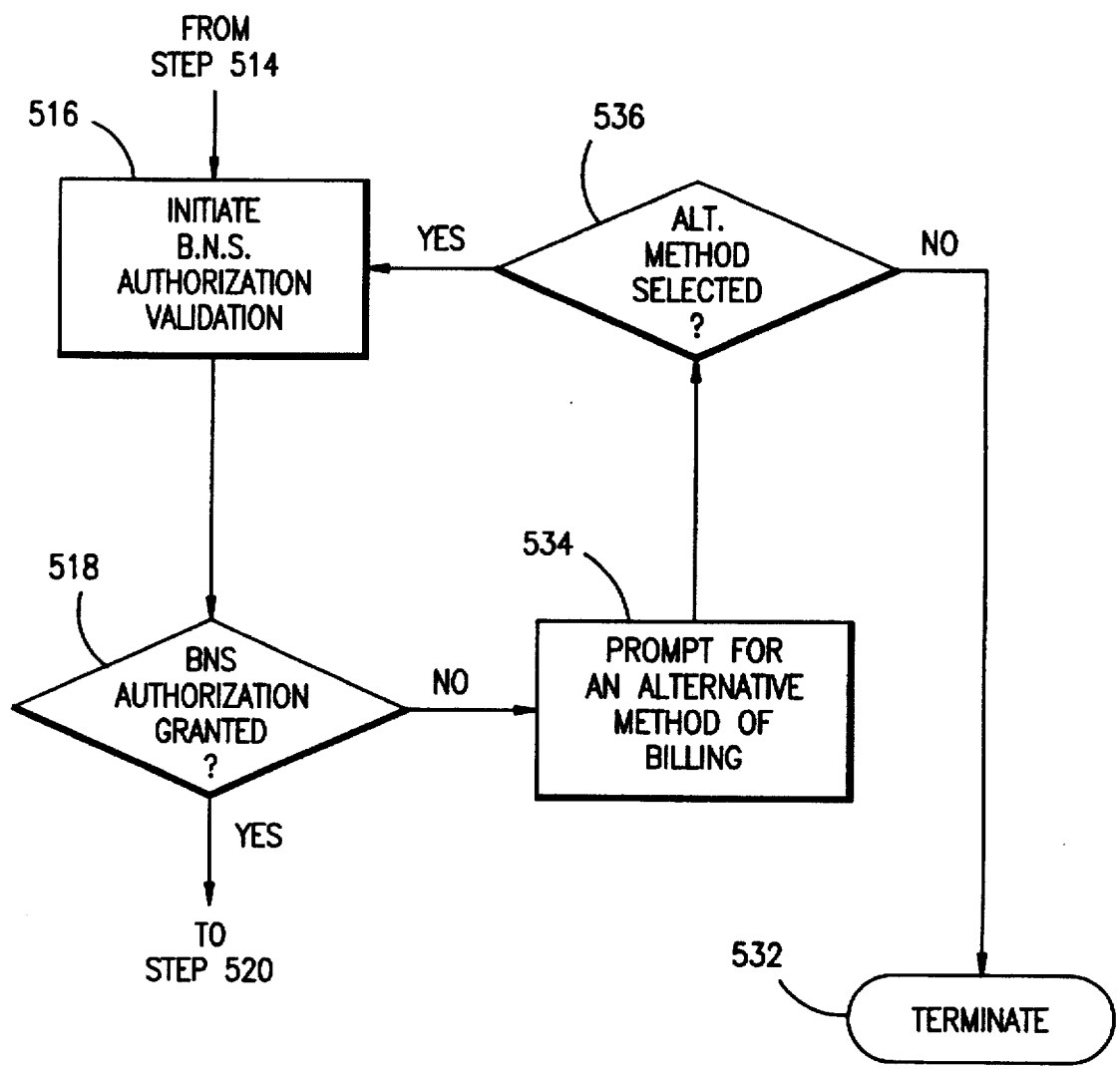
FIG. 5B is a sequence-of-events flow diagram for a BNS feedback option for the delayed authorization validation phone system of FIG. 5A.

Referring to FIG. 5B, BNS feed-back option is shown for prompting a caller to select an alternative method of billing in the event that a first method fails to receive a BNS authorization validation. In step 516 a BNS validation is initiated as described above. In step 518 a determination is made to either authorize or decline the billing method requested by a caller. If BNS authorization is granted, the scheme proceeds to step 520 as described in relation to FIG. 5A. If BNS authorization is denied, however, rather than simply terminating the call as described above, the caller is prompted in step 534 to select an alternative method of billing the requested phone call. For example, if the caller initially requested to bill a call to a credit card and a BNS search determined that the tendered credit card account was no longer valid, the caller is provided with an opportunity to submit a second credit card for validation. Alternatively, the caller can request to have the call billed to a third party or to the requested party.

In step 536, if the caller selects an alternative method of billing and provides necessary information such as name and account number, the new request is submitted to a BNS for authorization in step 516. In step 518, if BNS authorization is denied again, the caller is given a third opportunity to select an alternative method of billing in step 534. The phone company can, of course, limit the number of such retries by, for example, setting a maximum number of such attempts.

If BNS authorization is granted in step 518, either on a first, second or subsequent attempt, the call proceeds to step 520 and continues as previously described. With this optional feed-back loop the phone company attempts execute a billable call, even though the call was initially denied a BNS validation. This is a very significant improvement because it keeps a customer "in the store" in an attempt to complete a sale rather than simply dismissing the customer for failure to produce a valid account number on the first attempt.

Figure 5C:
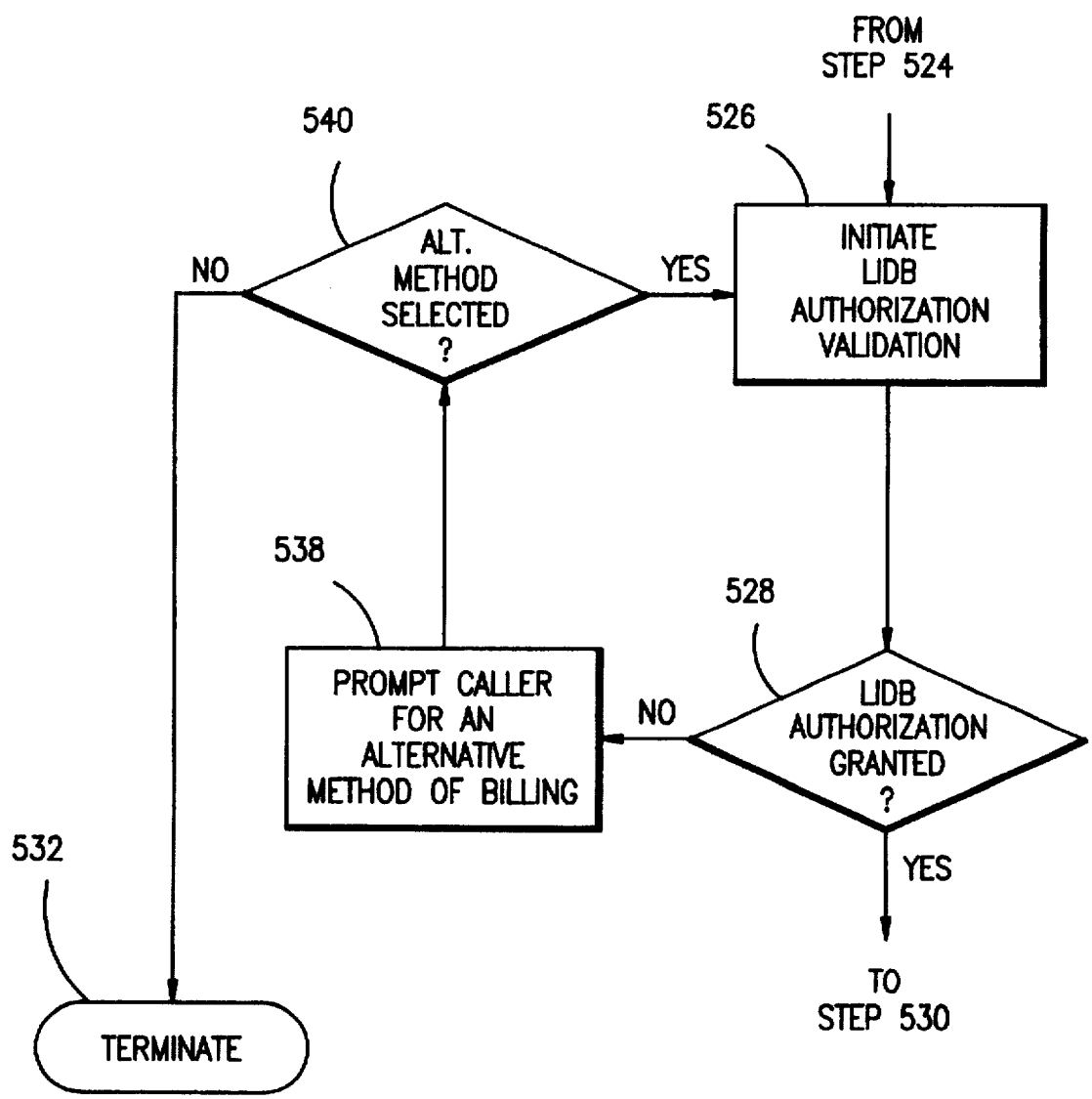
FIG. 5C is a sequence-of-events flow diagram for a LIDB feedback option for the delayed authorization validation phone system of FIG. 5A.

Carrying this philosophy a step further, FIG. 5C shows a LIDB feedback option, similar to the BNS feed-back option of FIG. 5B. This LIDB feedback loop which provides the caller with an opportunity to select an alternative method of payment in the event that LIDB authorization is denied.

In the LIDB feed-back option of FIG. 5C, if a LIDB validation is denied in step 528, the caller is prompted in step 538 to select an alternative billing method. Again, the caller may request that the call be billed to a credit card account, a third party account or to the requested party. In step 540, if the caller selects a new method of billing, the method is submitted to the LIDB in step 526 as a new authorization request. If LIDB approval is granted in step 528, the call proceeds to step 530. If not, the caller is provided in step 538 with another opportunity to select an alternate method of billing. If the caller declines to select an alternative method, or if the phone company is unwilling to provide another opportunity, the call is terminated in step 532.

Alternatively, in order to further reduce unnecessary LIDB queries, after the caller selects an alternative method of payment in step 540, the request may be sent to a local BNS for approval prior to querying a LIDB. Thus, if the selected method of billing is denied authorization by the BNS, then a LIDB query and its associated costs are avoided.

In the event that the calling party wishes to bill the requested party for a call, i.e., a collect call, the present invention provides two schemes for delaying LIDB queries. A first scheme 610 eliminates LIDB queries in cases where the requested line is busy or times-out. A second scheme 710 delays LIDB queries even further, until it is determined that the requested party is willing to accept the charges.

Referring to FIG. 6A, collect call scheme 610 is shown. Steps 612 through 628 are substantially the same as steps 512 through 528 in scheme 510. Minor differences do exist, primarily in regard to the types of data collected or searched. Step 614, for instance, is directed to collecting data necessary for a collect call rather than a credit card or third party call. Similarly, the BNS and LIDB authorization queries of steps 616, 618, 626 and 628 are directed at the ability of the requested party to pay rather that the ability of the call originator to pay. This is because, in a collect call scheme, it is the requestor who will be accepting the charges so the credit history of the call originator is of little interest.

Where scheme 610 differs substantially from scheme 510 is after LIDB authorization step 628. The reason for the difference is that, in a collect call scheme, the requested party must be given an opportunity to accept or decline the charges for the phone call. In step 630, therefore, rather than simply connecting the parties, as in step 530, the requested party is informed of the nature of the call and the name of the call originator. Where an automated operator system is employed, the requested party is informed by a pre-recorded message from the automated operator, which includes the name of the calling party, recorded in step 614.

In step 632 the requested party is given an opportunity to accept or decline the charges. Where an automated operator system is employed, the opportunity to accept or decline may be provided in any of a number of formats. For example, the requested party may be instructed to accept or decline with a voice response. In such a case, the automated operator system contains a voice recognition system for interpreting the response of the requested party. Typically, such a system requests the requested party to respond with a "yes" or a "no." After requesting a response, the system waits a predetermined period of time, during which it records any voice input from the requested party. At the end of the predetermined waiting period, the voice recognition system determines whether the requested party accepts or declines the charges.

As another example, an automated operator may require the requested party to respond through a keypad associated with the telephone of the requested party. For instance, the automated operator may instruct the requested party to indicate acceptance of a collect call by pressing "1" and a refusal by pressing "2." Typically, the automated operator waits a predetermined period of time for a response from the requested party, during which any keypad inputs from the requested party are stored by the automated operator. If no response is detected by the automated operator within the predetermined time period, or if multiple responses or non-option responses are detected, the system may repeat its prompt to the requested party any number of times. Often, such a system accepts a "#" sign from the requested party as an indication that the requested party has completed the necessary response. Essentially, a "#" sign terminates the predetermined waiting period. At the end of the waiting period, the automated operator system determines whether the requested party accepts or declines the charges.

If, in step 632, the requested party declines the charges, the call is terminated. If the requested party accepts, the parties are connected for conversation in step 634. When one of the parties hangs up their respective telephone, the phone system detects the on-hook condition and, in step 636, terminates the call.

Figure 6B:
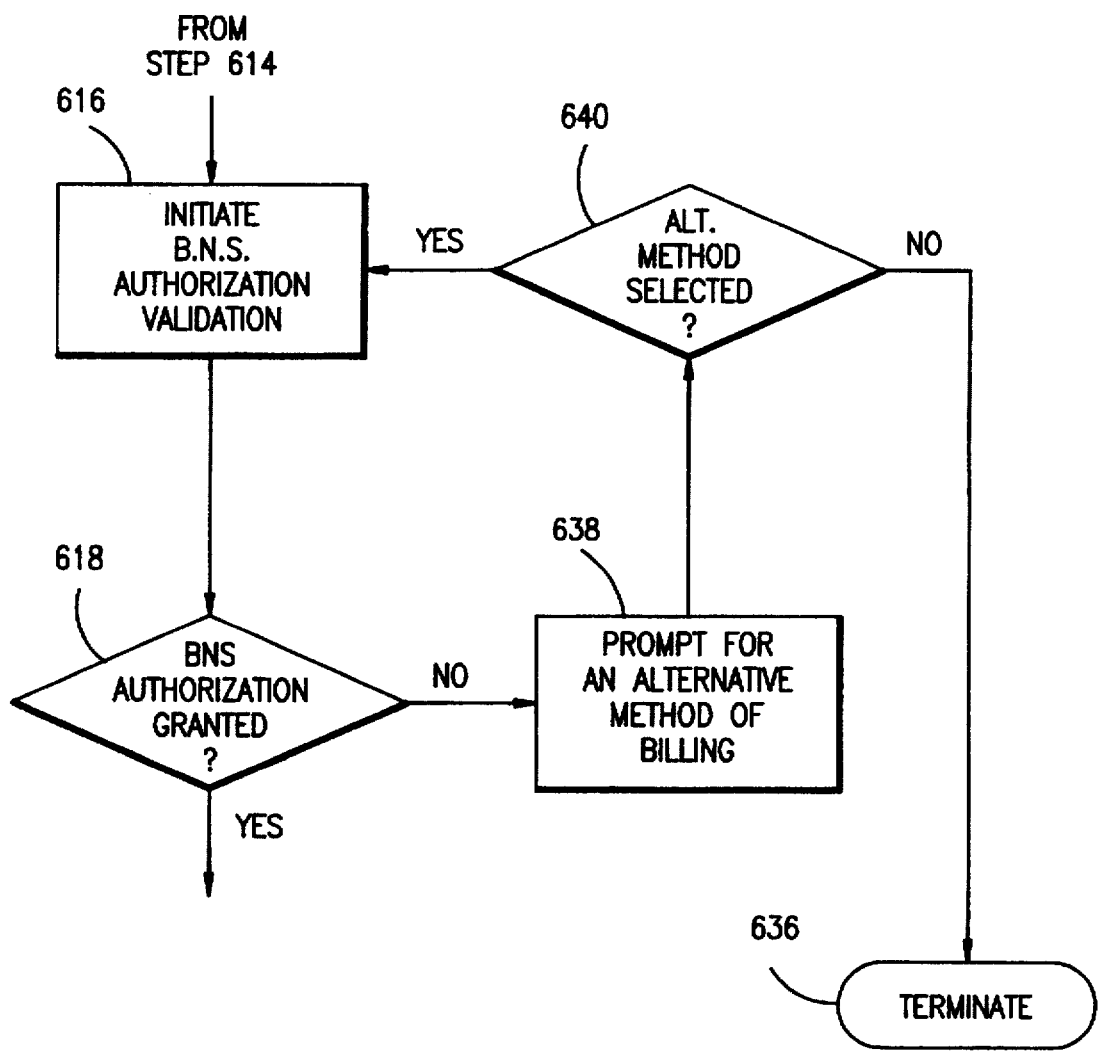
FIG. 6B is a sequence-of-events flow diagram for a BNS feedback option for the delayed authorization validation collect call phone system of FIG. 6A.

Referring to FIG. 6B, a BNS feed-back option is provided in a collect can scenario, substantially similar to the BNS feed-back option of FIG. 5. If BNS authorization is denied in step 618, then, in step 638, the caller is prompted to select an alternative method of billing. In step 640, if the caller selects an alternative method, then, in step 616, a new BNS query is initiated. If the caller declines to select an alternative method in step 640, then the call is terminated in step 636.

Figure 6C:
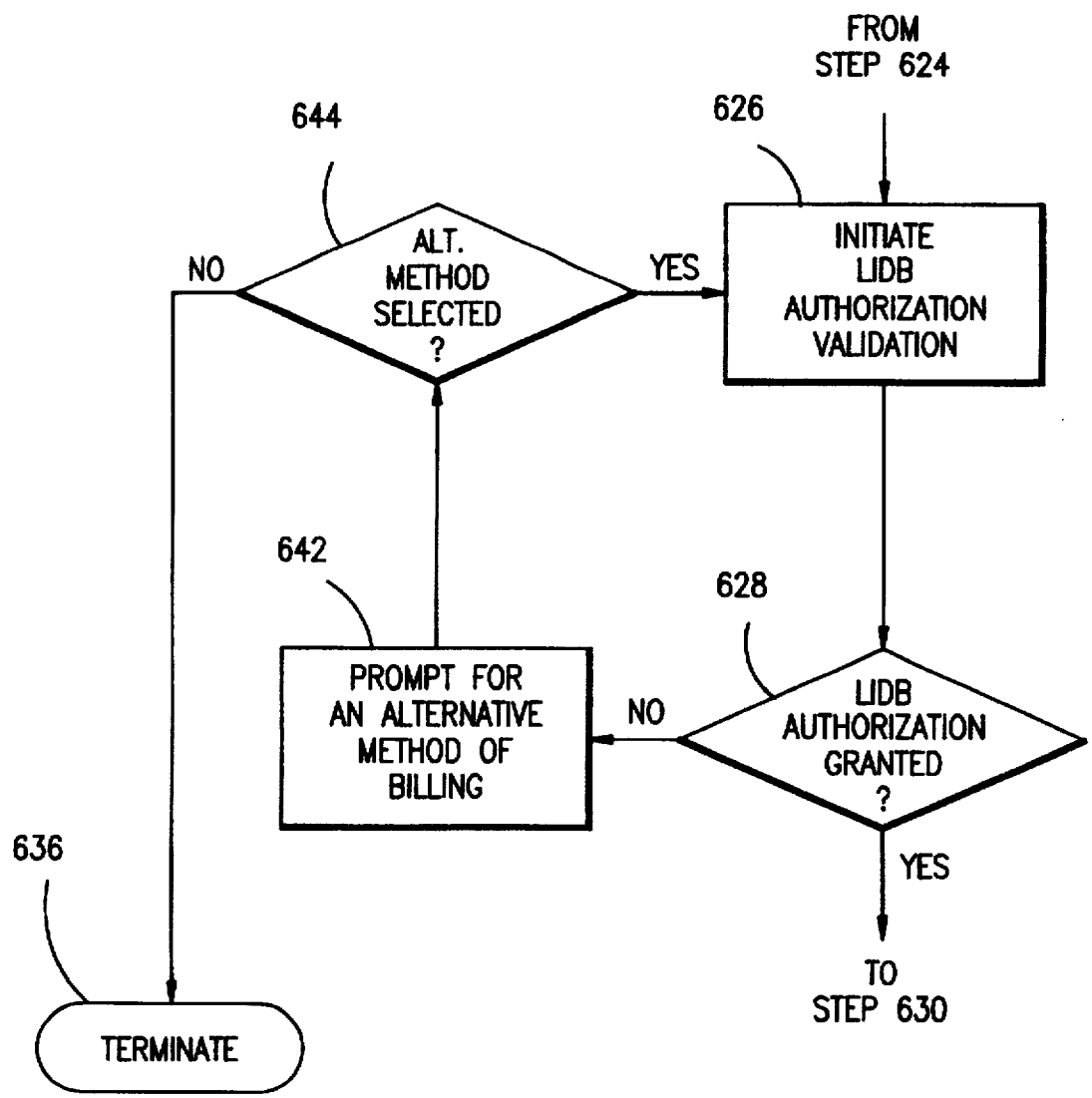
FIG. 6C is a sequence-of-events flow diagram for a LIDB feedback option for the delayed authorization validation collect call phone system of FIG. 6A.

Similarly, FIG. 6C shows a LIDB feed-back option for a collect call calling scheme similar to the LIDB feed-back option of FIG. 5C. If LIDB authorization is denied in step 628, the caller is prompted in step 642 to select an alternative method of billing the call. Upon selecting a new billing method in step 644, a new LIDB query is initiated in step 626. In step 644, If the caller declines to select an alternative method of big, the call is terminated in step 636.

As with the LIDB feed-back option of FIG. 5C, the alternative method of billing selected in step 644 may be submitted to a BNS for authorization prior to being submitted to the LIDB in step 626. If such a BNS query denies authorization, the caller could be prompted to select another method of payment.

Similarly, another feed-back loop (not shown), may be useful in the scheme of FIG. 6A where, in step 632, the requested party declines to accept charges. In that event, rather than simply terminating the call, a feed-back loop similar to that shown in FIG. 6B, can prompt the calling party to select an alternative method of billing. Upon selection of an alternative method of billing, the request would be sent to a BNS in step 616, as previously described.

In an alternative embodiment to collect call scheme 610, LIDB authorization queries are delayed beyond detection of an off-hook condition and to a point when the requested party actually accepts the charges. In this way, LIDB charges are avoided not only for calls that will prematurely terminate due to busy signals and non-answers but also avoided for calls that terminate due to a refusal by the requested party to accept the charges. In such a scheme, LIDB authorization query charges are not incurred until it is determined that the requested party is at least willing to accept the charges. This way, the only time a phone company will incur LIDB charges without also conducting a billable event, is when, despite acceptance of the charges by the requested party, the authorization of the requested party to make such an acceptance is denied through a subsequent LIDB authorization validation. As previously stated, because a LIDB query takes less than about 0.5 seconds, a LIDB query initiated after a requested party indicates a willingness to accept charges is concluded quickly enough so as not to significantly inconvenience any of the parties.

Referring to FIG. 7A, alternative collect call scheme 710 is shown. Steps 712 through 724 are substantially the same as steps 612–624 system 610. In step 722, for instance, as with step 622, if a busy signal is detected by the automated telephone operator, the call is terminated. Likewise, in step 724, as in step 624, if the requested phone rings a predetermined number of times without answering, a time-out is declared and the call is terminated.

In the event that someone answers the requested phone at steps 724 or 624, however, the subsequent sequence of events between schemes 710 and 610 differ. Recall that in scheme 610, when an off-hook condition is detected, a LIDB is immediately queried, before the requested party is informed of the nature of the call. In scheme 710, however, upon detection of an of-hook condition in step 724, the system immediately initiates a collect call message in step 726.

The receiving party is given an opportunity to accept or decline the charges in step 728. If the requested party declines to accept the charges, the call is terminated. Only if the requested party accepts the charges will a LIDB query be initiated in step 730. Although both the call originating party and the requested party are on hold while a LIDB query is executed, because the LIDB authorization is typically completed in less than about 0.5 seconds, neither of the parties will be unduly inconvenienced by the delay. During the on-hold period, a prerecorded message can be played and transmitted to receiving party and possibly the calling party. Such a message may be to the effect of "please wait while we process your reply" or a message may inform that a credit check is being performed and will conclude shortly. In addition to, or instead of providing such information, pleasant sounds such as music may be played during the on-hold period. In either case, the point is to keep the callers on the line by some combination of not causing the parties to wonder what is happening and keeping them comfortable during any waiting period, no matter how short.

In step 732, LIDB authorization is validated or declined. If verified, because the receiving party has already agreed to accept the charges, the parties are connected and the requested party is billed accordingly. At the conclusion of the call, the call is terminated in step 736. If declined, the requested party might be informed of the reason for denial, after which the call is terminated. The fact of the denial along with associated information might be stored in a local BNS database for future reference.

Figure 7B:
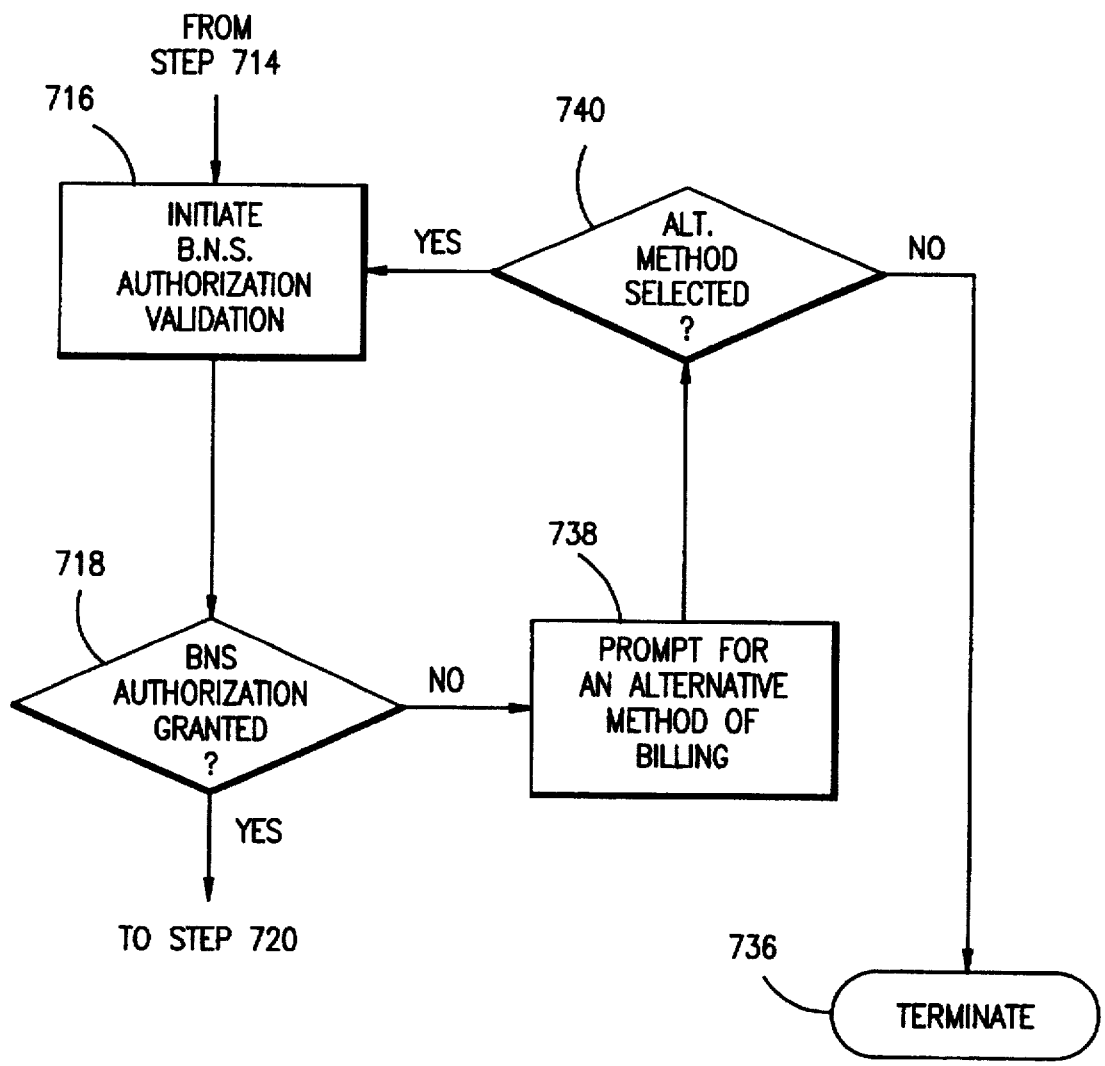
FIG. 7B is a sequence-of-events flow diagram for a BNS feedback option for the delayed authorization validation collect call phone system of FIG. 7A.

Referring to FIG. 7B, a BNS feed-back option is provided for the delayed LIDB collect call scenario of FIG. 7A, substantially similar to the BNS feed-back options of FIGS. 5B and 6B. If BNS authorization is denied in step 718, then, in step 738, the caller is prompted to select an alternative method of billing. In step 740, if the caller selects an alternative method, then, in step 716 a new BNS query is initiated. If, however, the caller declines to select an alternative method in step 740, then the call is terminated in step 736.

Referring to FIG. 7C, a LIDB feed-back option for is provided for the delayed LIDB collect call scheme of FIB. 7A. This feed-back scheme differs from that of FIG. 6C in that it provides for prompting both the requested party and the caller to select alternative methods of billing in the event of an LIDB denial.

Recall that in step 728 of the scheme of FIG. 7A, if the requested party agrees to accept the charges for the call, the caller remains on the line, possibly on hold, while the LIDB is queried. The requested party is thus on the phone an is willing to pay for the call. If a subsequent LIDB query denies authorization in step 732, due to, for example, a bad credit history associated with the phone of the requested party, the requested part may be willing to have another account, such as a credit card account, billed for the call.

In operation, if the LIDB denies authorization in step 732, the requested party is prompted in step 742 to select an alternative method of billing the call. Upon selecting a new big method in step 744, a new LIDB query is initiated in step 730. Alternatively, a BNS query could precede the LIDB query of step 730. If the LIDB grants authorization in step 732, the call proceeds as described in relation to FIG. 7A. If LIDB denies authorization, the requested party is again prompted to select another method of payment in step 742.

If the requested declines to select another method of payment in step 744, whether on a first, a second or any subsequent prompt, then, in step 746, the calling party is prompted to select an alternative method of payment. Upon selecting a new billing method in step 748, a new LIDB query is initiated in step 750. Alternatively, a BNS query could precede the LIDB query of step 750. If the LIDB grants authorization in step 752, the scheme proceeds to step 734, as described in relation to FIG. 7A. If the LIDB denies authorization in step 752, the calling party is again prompted to select another method of payment in step 746. If the caller declines to select an alternative method of billing in step 748, then the call is terminated in step 736.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for placing a telephone call, comprising the steps of:
    (1) receiving a request from a caller to place a telephone call to a requested telephone, the request including a request to bill the telephone call according to a first billing scheme;
    (2) dialing the requested telephone; and
    (3) delaying a query to a pay-to-use data base at least until an off-hook condition is detected.

2. The method of claim 1, wherein step (3) comprises the step of:
    (a) delaying a query to a Line Information data base.

3. The method of claim 1, wherein step (3) comprises the steps of:
    (a) detecting the off-hook condition;
    (b) querying the pay-to-use database a first time;
    (c) determining that the first billing scheme is not authorized;
    (d) prompting the caller to select an alternative billing scheme;
    (e) receiving an alternative billing scheme selection from the caller; and
    (f) querying the pay-to-use data base a second time.

4. The method of claim 1, wherein step (3) comprises the step of:
    (a) prompting an answerer of the requested telephone to accept collect call charges.

5. The method of claim 4, wherein step (3) further comprises the step of:
    (b) querying the pay-to-use database before prompting the answerer to accept the collect call charges.

6. The method of claim 4, wherein step (3) further comprises the step of:
    (b) delaying the query to the pay-to-use data base at least until the answerer responds to the prompt to accept the collect call charges.

7. The method of claim 4, wherein step (3) further comprises the steps of:
    (b) delaying the query to the pay-to-use data base at least until receiving an alternative-billing scheme selection from the answerer.

8. The method of claim 4, wherein step (3) further comprises the steps of:

(b) delaying the query to the pay-to-use data base at least until receiving an alternative-billing scheme selection from the caller.

9. The method of claim 4, wherein step (3) further comprises the steps of:

(b) receiving a refusal from the answerer; and (c) terminating the call without querying the pay-to-use data base.

10. The method of claim 1, further comprising the step of:

(4) terminating the call when a busy signal is detected, without querying the pay-to-use data base.

11. The method of claim 1, further comprising the step of:

(4) terminating the call when the requested phone rings a predetermined number of times, without querying the pay-to-use data base.

12. The method of claim 1, wherein step (3) comprises the step of:

(a) delaying a screening of a calling card.

13. The method of claim 1, wherein step (3) comprises the step of:

(a) delaying a screening of a Local Exchange Card.

14. The method of claim 1, wherein step (3) comprises the step of:

(a) delaying a screening of a third party account.

15. The method of claim 1, wherein step (3) comprises the step of:

(a) delaying a screening of a billing number.

16. The method of claim 15, wherein step (3)(a) comprises the step of:

(i) delaying a screening of a calling number.

17. The method of claim 15, wherein step (3)(a) comprises the step of:

(i) delaying a screening of a called number.

18. The method of claim 1, wherein step (3) comprises the step of:

(a) delaying a screening for line restrictions.

19. The method of claim 18, wherein step (3)(a) comprises the step of:

(i) delaying a screening for calling line restrictions.

20. The method of claim 18, wherein step (3)(a) comprises the step of:

(i) delaying a screening for called line restrictions.

21. The method of claim 1, wherein step (3) comprises the step of:

(a) delaying a public telephone check.

22. The method of claim 21, wherein step (3)(a) comprises the step of:

(i) delaying a determination as to whether the calling telephone is a public telephone.

23. The method of claim 21, wherein step (3)(a) comprises the step of:

(i) delaying a determination as to whether the called telephone is a public telephone.

24. The method of claim 1, wherein step (2) comprises the step of:

(a) querying a Bad Number Data Base before dialing the requested telephone.

25. The method of claim 24, wherein step (2)(a) comprises the steps of:

(i) querying the Bad Number Data Base a first time;
(ii) determining that the requested call is not authorized;
(iii) prompting the caller to select an alternative-billing scheme; and
(iv) querying the Bad Number Data Base a second time.

26. A method for placing a collect telephone call from a collect-call-only telephone, comprising the steps of:

(1) receiving a request from the collect-call-only telephone to place a collect telephone call to a requested telephone;

(2) prompting the collect-call-only telephone for information;

(3) receiving and recording the information;

(4) dialing the requested telephone; and (5) delaying a query to a pay-to-use database at least until an off-hook condition is detected.

27. The method of claim 26, further comprising the step of:

(6) terminating the collect telephone call when a busy signal is detected, without querying the pay-to-use data base.

28. The method of claim 26, further comprising the step of:

(6) terminating the collect-call telephone call when the requested phone rings a predetermined number of times, without querying the pay-to-use data base.

29. The method of claim 26, further comprising the steps of:

(6) prompting an answerer of the requested telephone to accept the collect telephone call; and, (7) terminating the collect telephone call when the answerer refuses to accept the collect call charges, without querying the pay-to-use data base.

30. The method of claim 26, wherein step (5) comprises the step of:

(a) querying the pay-to-use database before prompting an answerer to accept the collect call charges.

31. The method of claim 26, wherein step (5) comprises the step of:

(a) delaying the query to the pay-to-use data base at least until an answerer accepts the collect call charges.

32. The method of claim 26, wherein step (5) comprises the step of:

(a) delaying the query to the pay-to-use data base until receiving an alternative-billing scheme selection from an answerer of the requested telephone.

33. The method of claim 26, wherein step (5) comprises the steps of:

(a) prompting an answerer of the requested telephone to accept collect call charges;

(b) receiving a refusal from the answerer; and (c) terminating the call without querying the pay-to-use data base.

34. The method of claim 26 wherein step (4) comprises the step of:

(a) placing the collect-call-only telephone on hold.

35. A telephone system, comprising:

an automated operator system that couples a collect-call-only call-originating telephone with a requested telephone; and delaying means for delaying a query to a pay-to-use data base at least until an off-hook condition is detected.

36. The telephone system of claim 35, wherein said delaying means comprises:

means for delaying a query to a Line Information data base.

* * * * *